United States Patent [19]
Banba et al.

[11] Patent Number: 5,724,459
[45] Date of Patent: Mar. 3, 1998

[54] OPTICAL MODULATION DEVICE AND FIBER OPTIC COMMUNICATION SYSTEM

[75] Inventors: Seiichi Banba, Kyoto; Minoru Sawada, Yawata; Yasoo Harada, Hirakata, all of Japan

[73] Assignee: Sanyo Electric Co., Ltd., Moriguchi, Japan

[21] Appl. No.: 675,158

[22] Filed: Jul. 3, 1996

[30] Foreign Application Priority Data

Jul. 5, 1995 [JP] Japan ..................... 7-169441

[51] Int. Cl.$^6$ ..................... G02B 6/10
[52] U.S. Cl. ............... 385/3; 385/24; 359/154; 359/181; 359/245
[58] Field of Search ............... 359/245, 252, 359/154, 157, 180, 181; 385/1, 2, 3, 24

[56] References Cited

U.S. PATENT DOCUMENTS

| | | | |
|---|---|---|---|
| 5,351,317 | 9/1994 | Weber | 385/3 |
| 5,363,230 | 11/1994 | Djupsjobacka | 359/181 |
| 5,467,414 | 11/1995 | Birkmayer et al. | 385/3 |
| 5,488,677 | 1/1996 | Tokano | 385/3 |

OTHER PUBLICATIONS

Asher Madjar et al., "A Balanced Fiberoptic Communication Link Featuring Laser Rin Cancellation", IEEE Microwave Theory and Techniques Society, 1992 Symposium Digest (1992 IEEE MTT–S Digest); pp. 563–566.

Hiroyo Ogawa et al.; "Fiber Optic Microwave Links Using Balanced Laser Harmonic Generation, and Balanced/Image Cancellation Laser Mixing", IEEE Microwave Theory and Techniques Society, 1992 Symposium Digest (1992 IEEE MTT–S Digest); pp. 559–562.

*Primary Examiner*—John Ngo
*Attorney, Agent, or Firm*—Armstrong, Westerman, Hattori, McLeland & Naughton

[57] ABSTRACT

A optical divider equally divides a optical carrier into first and second optical carriers. A 180° divider divides an RF sub-carrier signal into first and second RF sub-carrier signals whose phases are 180° inverted from each other. An electro-optic modulator modulates the first optical carrier with the first RF sub-carrier signal and outputs a first optical signal. An electro-optic modulator modulates the second optical signal with the second RF sub-carrier signal and outputs a second optical signal. Photodiodes convert the first and second optical signals transmitted by the optical fibers into first and second electric signals, respectively. A 180° combiner inverts by 180° the phase of the first electric signal and combines it with the second electric signal.

20 Claims, 4 Drawing Sheets

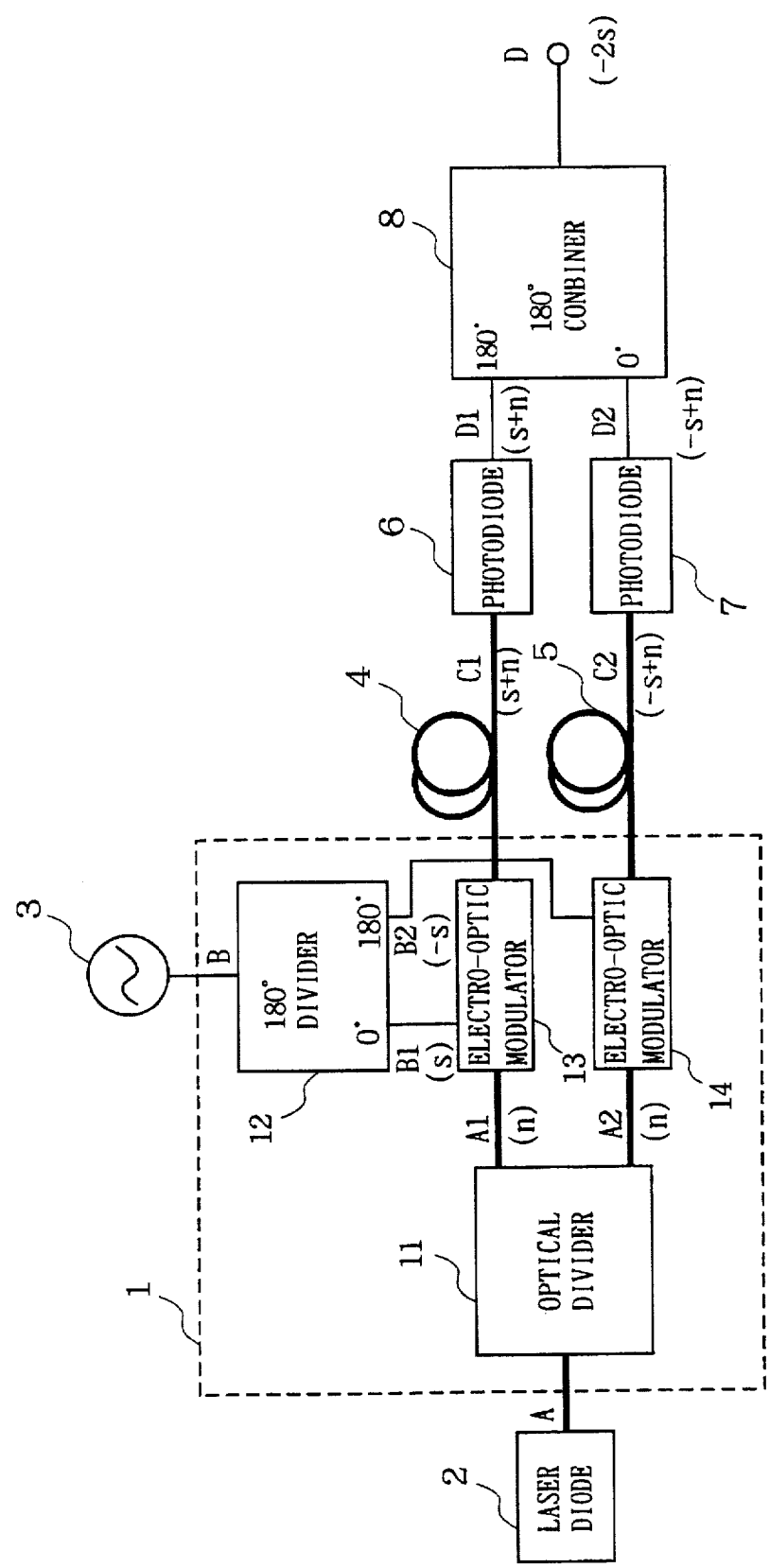

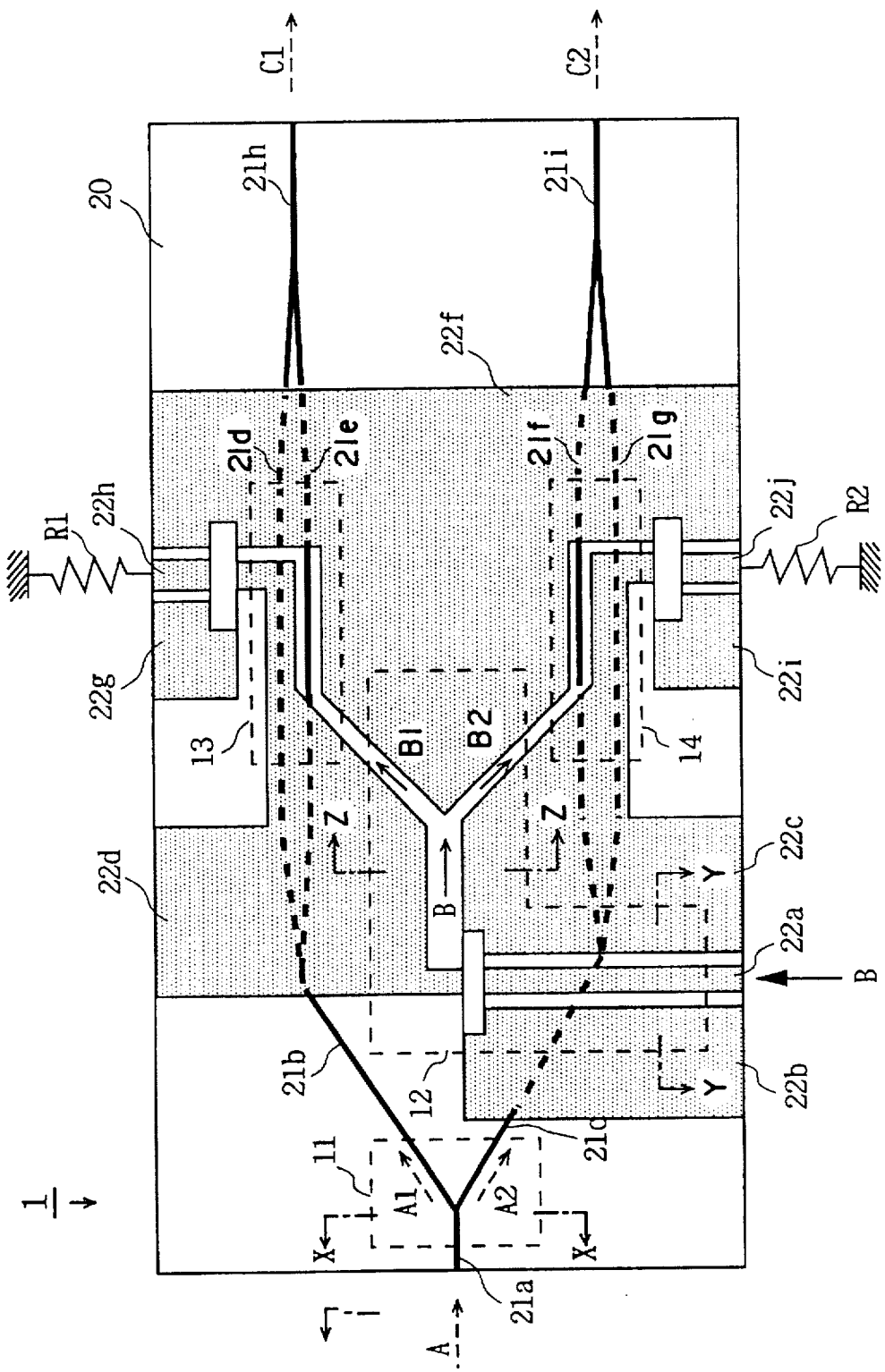

5,724,459

OPTICAL MODULATION DEVICE AND FIBER OPTIC COMMUNICATION SYSTEM

BACKGROUND OF THE INVENTION

1. Field of the Invention

The present invention relates to an optical modulation device for modulating light with a high-frequency signal and a fiber optic communication system using the same.

2. Description of the Background Art

With the development of the communication system, studies are conducted on the application of the optical fiber transmission technology to the communication system. In the optical fiber link sub-carrier transmission system, a optical carrier generated from a light source is modulated with a sub-carrier signal and the modulated optical signal is transmitted using the optical fiber.

In such a system, the S/N ratio can be enhanced more as the output level of the optical carrier from the light source is higher. If the level of the optical carrier is increased without limitation, however, relative intensity noise (RIN) of a laser diode used as a light source increases, and then the S/N ratio will decrease.

Accordingly, the fiber optic communication system shown in FIG. 4 is proposed for the purpose of suppressing the relative intensity noise. In FIG. 4, a optical carrier A generated from a laser diode 31 is provided to a divider 32. The optical divider 32 divides the optical carrier A equally into a first optical carrier A1 and a second optical carrier A2. An RF sub-carrier signal (Radio Frequency sub-carrier signal) B generated by a signal source 33 is provided to an electro-optic modulator 34.

The electro-optic modulator 34 intensity-modulates the first optical carrier A1 outputted from the optical divider 32 with the RF sub-carrier signal B outputted from the signal source 33 and outputs the modulated optical signal C1. The optical signal C1 is transmitted by an optical fiber 35. The second optical carrier A2 outputted from the optical divider 32 is transmitted by an optical fiber 36.

A photodiode 37 converts the optical signal C1 transmitted through the optical fiber 35 into a first electric signal D1, which is modulated with the RF sub-carrier signal. A photodiode 38 converts the second optical carrier A2 transmitted through the optical fiber 36 into a second electric signal D2. A 180° combiner 39 inverts by 180° the phase of the second electric signal D2 and combines it with the first electric signal D1. Thus an RF signal D is outputted from the 180° combiner.

Since the laser diode 31 has the relative intensity noise (RIN), the first and second optical carriers A1 and A2 outputted from the optical divider 32 include noises n. The RF sub-carrier signal B generated from the signal source 33 includes a signal s. Accordingly, the optical signal C1 outputted from the electro-optic modulator 34 includes the signal s and the noise n.

Since the optical signal C1 transmitted by the optical fiber 35 includes the signal s and the noise n and the second optical carrier A2 transmitted by the optical fiber 36 includes the noise n, the first electric signal D1 outputted from the photodiode 37 includes the signal s and the noise n and the second electric signal D2 outputted from the photodiode 38 includes the noise n.

Since the second electric signal D2 is combined with the first electric signal D1 with its phase inverted by 180°, the noise n of the first electric signal D1 and the noise n of the second electric signal D2 cancel and the RF signal D outputted from the 180° combiner 39 includes the signal s only. This way, the relative intensity noise of the laser diode 31 is suppressed.

Since the electro-optic modulator 34 has optical insertion loss, however, the level of the noise n included in the optical signal C1 is lower than the level of the noise n included in the first optical carrier A1, and thus the level of the noise n included in the optical signal C1 differs from the level of the noise n included in the second optical carrier A2.

This way, as one of the optical transmission lines includes the electro-optic modulator 34 having optical insertion loss and the other does not include one, the two optical transmission lines do not perform balanced operation. As it is difficult to adjust the transmission system so that the two optical transmission lines perform balanced operation, the noise can not be perfectly canceled in the 180° combiner 39, and then the noise remains in the RF signal D. Accordingly, the relative intensity noise can not be suppressed sufficiently, and the S/N ratio can not be enhanced.

SUMMARY OF THE INVENTION

An object of the present invention is to provide an optical modulation device capable of suppressing the relative intensity noise to increase the S/N ratio.

Another object of the present invention is to provide a fiber optic communication system capable of suppressing the relative intensity noise to increase the S/N ratio.

An optical modulation device according to the present invention includes a optical divider (optical branching means), a power divider (signal dividing means), a first external modulator (first external modulating means) and a second external modulator (second external modulating means).

The optical divider divides an inputted light into first and second lights. The power divider divides an inputted high-frequency signal into first and second high-frequency signals with mutually substantially inverted phases. The first external modulator modulates the first light outputted from the optical divider with the first high-frequency signal outputted from the power divider. The second external modulator modulates the second light outputted from the optical divider with the second high-frequency signal outputted from the power divider.

In the optical modulation device according to the present invention, the first and second lights outputted from the optical divider include noises with the same phase originating from the relative intensity noise of the light source. The first and second high-frequency signals outputted from the power divider include signals with mutually inverted phases. Thus, the optical signals outputted from the first and second external modulators include signals with mutually inverted phases and noises with the same phase.

Since the first and second lights individually pass through the external modulators, they have almost equal optical insertion losses and therefore the optical signal intensities outputted from the first and second external modulators are also almost equal. Accordingly, it is possible to cancel the noises included in the optical signals. Hence, the use of the optical modulation device according to the present invention allows construction of a fiber optic transmission system without restricted by the relative intensity noise of the light source.

Particularly, it is preferred that the optical divider, the power divider, the first external modulator and the second external modulator are integrated on and/or in a dielectric substrate having the electro-optical effect. In this case, the optical modulation device can stably perform balanced operation.

It is also preferred that the first external modulator and the second external modulator are formed approximately symmetrically to each other on and/or in a dielectric substrate having the electro-optical effect. This allows the first and second external modulators to perform balanced operation without adjustment.

The optical divider may include a first optical waveguide transmitting the inputted light and second and third optical waveguides branching from the first optical waveguide for transmitting the first and second lights, respectively.

The power divider may include a first line for transmitting the inputted high-frequency signal and second and third lines branching from the first line for transmitting the first and second high-frequency signals, respectively.

The first external modulator may include fourth and fifth optical waveguides formed on and/or in a dielectric substrate, and branching from a first input portion receiving the first light from the optical divider and meeting at a first output portion, and a fourth line formed on the dielectric substrate along the fourth optical waveguide for transmitting the first high-frequency signal from the power divider, and the second external modulator may include sixth and seventh optical waveguides formed on and/or in the dielectric substrate, and branching from a second input portion receiving the second light from the optical divider and meeting at a second output portion, and a fifth line formed on the dielectric substrate along the sixth optical waveguide for transmitting the second high-frequency signal from the power divider.

Particularly, the optical divider may include a first optical waveguide formed on and/or in the dielectric substrate for transmitting the inputted light, and second and third optical waveguides formed on and/or in the dielectric substrate and branching from the first optical waveguide for transmitting the first and second lights, respectively, the power divider may include a first line formed on the dielectric substrate for transmitting the inputted high-frequency signal, and second and third lines formed in the dielectric substrate and branching from the first line for transmitting the first and second high-frequency signals, respectively, the first external modulator may include fourth and fifth optical waveguides formed on and/or the dielectric substrate, and branching from a first input portion receiving the first light from the optical divider and meeting at a first output portion, and a fourth line formed on in the dielectric substrate along the fourth optical waveguide for transmitting the first high-frequency signal from the power divider, and the second external modulator may include sixth and seventh optical waveguides formed on and/or in the dielectric substrate, branching from a second input portion receiving the second light from the optical divider and meeting at a second output portion, and a fifth line formed on the dielectric substrate along the sixth optical waveguide for transmitting the second high-frequency signal from the power divider.

It is preferred that the first and second external modulators are formed approximately symmetrically to each other on and/or in the dielectric substrate. This allows the first and second external modulators to perform balanced operation without adjustment.

The first optical waveguide may include a first diffusion region formed in the surface of the dielectric substrate, the second optical waveguide may include a second diffusion region formed in the surface of the dielectric substrate and connecting to the first diffusion region, and the third optical waveguide may include a third diffusion region formed in the surface of the dielectric substrate and connecting to the first diffusion region.

The first line may include a first co-planar waveguide formed on the surface of the dielectric substrate and a first slot line formed on the surface of the dielectric substrate and connecting to the first co-planar waveguide, the second line may include a second slot line formed on the surface of the dielectric substrate and connecting to the first slot line, and the third line may include a third slot line formed on the surface of the dielectric substrate and connecting to the first slot line.

The fourth and fifth optical waveguides may include fourth and fifth diffusion regions, respectively, formed in the surface of the dielectric substrate, the sixth and seventh optical waveguides may include sixth and seventh diffusion regions, respectively, formed in the surface of the dielectric substrate, the fourth line may include a fourth slot line formed on the surface of the dielectric substrate along the fourth diffusion region and connecting to the second line, and a second co-planar waveguide formed on the surface of the dielectric substrate and connecting to the fourth slot line, and the fifth line may include a fifth slot line formed on the surface of the dielectric substrate along the sixth diffusion region and connecting to the third line, and a third co-planar waveguide formed on the surface of the dielectric substrate and connecting to the fifth slot line, and the second co-planar waveguide and the third co-planar waveguide may be terminated at resistors.

A fiber optic communication system according to another aspect of the present invention includes a light source for generating a light, a signal source for generating a high-frequency signal, a optical divider (optical branching means), a power divider (signal dividing means), a first external modulator (first external modulating means), a second external modulator (second external modulating means), a first optical fiber, a second optical fiber, a first light detector (first light detecting means), a second light detector (second light detecting means), and a combiner (signal combining means).

The optical divider divides the light generated from the light source into first and second lights. The power divider divides the high-frequency signal generated from the signal source into first and second high-frequency signals with mutually substantially inverted phases. The first external modulator modulates the first light outputted from the optical divider with the first high-frequency signal outputted from the power divider to output a first optical signal. The second external modulator modulates the second light outputted from the optical divider with the second high-frequency signal outputted from the power divider to output a second optical signal.

The first optical fiber transmits the first optical signal outputted from the first external modulator. The second optical fiber transmits the second optical signal outputted from the second external modulator. The first light detector converts the first optical signal transmitted by the first optical fiber into an electric signal. The second light detector converts the second optical signal transmitted by the second optical fiber into an electric signal. The combiner substantially inverts the phase of one of the electric signals outputted from the first and second light detectors and combines it with the other electric signal.

In the optical fiber communication system according to the present invention, the first and second lights outputted from the optical divider include noises with the same phase originating from the relative intensity noise of the light source. The first high-frequency signal and the second high-frequency signal outputted from the power divider include signals mutually inverted in phase. Thus, the first and second optical signals outputted from the first and second external modulators include signals mutually inverted in phase and noises of the same phase.

Accordingly, the first and second optical signals transmitted by the first and second optical fibers include signals mutually inverted in phase and noises with the same phase. Similarly, the electric signals outputted from the first and second light detectors include signals mutually inverted in phase and noises of the same phase.

Since one of the electric signals is inverted in phase by the combiner and combined with the other electric signal, the noise of the one electric signal and the noise of the other electric signal are compensated for each other and the signals of the two signals are added to each other.

Furthermore, since the first light and the second light respectively pass through the external modulators, the optical insertion losses are equal. Accordingly, the transmission lines for the first and second optical signals perform balanced operation and the levels of the noises included in the first and second optical signals are thus equal, which allows the combiner to perfectly cancel the noises.

As a result, the relative intensity noise of the light source is suppressed and the level of the signal increases and then the S/N ratio increases. This provides a fiber optic communication system which is not restricted by the relative intensity noise of the light source.

It is preferred that the optical divider, the power divider, the first external modulator and the second external modulator are integrated on and/or in a dielectric substrate having the electro-optical effect. In this case, the first and second external modulators can stably perform balanced operation.

It is preferred that the first external modulator and the second external modulator are formed approximately symmetrically to each other on and/or in a dielectric substrate having the electro-optical effect. This allows the first and second external modulators to perform balanced operation without adjustment.

The optical divider may include a first optical waveguide for transmitting the inputted light, and second and third optical waveguides branching from the first optical waveguide for transmitting the first and second lights, respectively.

The power divider may include a first line for transmitting the inputted high-frequency signal, and second and third lines branching from the first line for transmitting the first and second high-frequency signals.

The first external modulator may include fourth and fifth optical waveguides formed on and/or in a dielectric substrate having the electro-optical effect and branching from a first input portion receiving the first light from the optical divider and meeting at a first output portion, and a fourth line formed on the dielectric substrate along the fourth optical waveguide for transmitting the first high-frequency signal from the power divider, and the second external modulator may include sixth and seventh optical waveguides formed on and/or in the dielectric substrate and branching from a second input portion receiving the second light from the optical divider and meeting at a second output portion, and a fifth line formed on the dielectric substrate along the sixth optical waveguide for transmitting the second high-frequency signal from the power divider.

The light source may comprise of a laser diode. The first and second light detectors may comprise of photo-electric conversion elements.

The light generated by the light source may be a optical carrier, and the high-frequency signal generated by the signal source may be a high-frequency sub-carrier signal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a fiber optic communication system in an embodiment of the present invention.

FIG. 2 is a plan of the optical modulation device in the fiber optic communication system of FIG. 1.

DESCRIPTION OF THE PREFERRED EMBODIMENTS

Figure 3A:
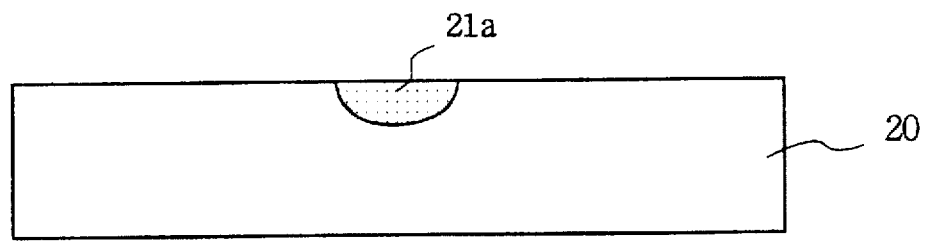
FIG. 3A is a sectional view taken along the section X—X in FIG. 2.

FIG. 1 is a block diagram showing the structure of a fiber optic communication system in an embodiment of the present invention.

The fiber optic communication system of FIG. 1 includes an optical modulation device 1, a laser diode 2, a signal source 3, optical fibers 4 and 5, photodiodes 6 and 7 and a 180° combiner 8. The optical modulation device 1 includes a optical divider 11, a 180° divider 12 and electro-optic modulators 13 and 14 formed of electro-optical effect elements. The electro-optic modulator is a kind of external modulator.

A optical carrier A generated by the laser diode 2 is provided to the optical divider 11. The optical divider 11 divides the optical carrier A equally into a first optical carrier A1 and a second optical carrier A2. An RF sub-carrier signal B generated by the signal source 3 is provided to the 180° divider 12. The 180° divider 12 generates a first RF sub-carrier signal B1 having the same phase as the RF sub-carrier signal B and a second RF sub-carrier signal B2 having its phase different by 180° from that of the RF sub-carrier signal B.

The electro-optic modulator 13 modulates the first optical carrier A1 outputted from the optical divider 11 with the first RF sub-carrier signal B1 outputted from the 180° divider 12 and outputs a modulated first optical signal C1. The electro-optic modulator 14 modulates the second optical carrier A2 outputted from the optical divider 11 with the second RF sub-carrier signal B2 outputted from the 180° divider 12 and outputs a modulated second optical signal C2.

The optical fiber 4 transmits the first optical signal C1 outputted from the electro-optic modulator 13. The optical fiber 5 transmits the second optical signal C2 outputted from the electro-optic modulator 14. The photodiode 6 converts the first optical signal C1 transmitted by the optical fiber 4 into a first electric signal D1. The photodiode 7 converts the second optical signal C2 transmitted by the optical fiber 5 into a second electric signal D2.

The 180° combiner 8 receives the first electric signal D1 outputted from the photodiode 6 and the second electric signal D2 outputted from the photodiode 7, and then inverts the phase of the first electric signal D1 by 180° and combines it with the second electric signal D2, and outputs a combined RF signal D.

As the laser diode 2 has the relative intensity noise, the first optical carrier A1 and the second optical carrier A2 outputted from the optical divider 11 include the noise n of the same phase. The first RF sub-carrier signal B1 outputted from the 180° divider 12 includes the signal s with the same phase as the RF sub-carrier signal B and the second RF sub-carrier signal B2 includes the signal −s having its phase inverted by 180° with respect to that of the RF sub-carrier signal B.

Accordingly, the optical signal C1 transmitted through the optical fiber 4 includes the signal s and the noise n and the optical signal C2 transmitted through the optical fiber 5 includes the signal −s and the noise n. Similarly, the first electric signal D1 outputted from the photodiode 6 includes the signal s and the noise n and the second electric signal D2 outputted from the photodiode 7 includes the signal −s and the noise n.

Since the first electric signal D1 is 180° inverted in phase by the 180° combiner 8 and combined with the second electric signal D2, the noise n of the first electric signal D1 and the noise n of the second electric signal D2 are canceled, so that the RF signal D outputted from the 180° combiner 8 includes the signal −2s at the twofold level.

Furthermore, since the first optical carrier A1 and the second optical carrier A2 pass through the electro-optic modulators 13 and 14, respectively, optical insertion losses are equal to each other and the first optical signal C1 and the second optical signal C2 are balanced. Hence, the levels of the noises included in the first optical signal C1 and the second optical signal C2 are equal, and the noises are perfectly canceled by the 180° combiner.

This way, the relative intensity noise of the laser diode 2 is eliminated and the level of the signal is doubled, i.e., increased by 3 dB. As a result, the S/N ratio increases.

In order to sufficiently remove the relative intensity noise, it is preferred that the characteristics of the electro-optic modulators 13 and 14 are equal, the characteristics of the optical fibers 4 and 5 are equal, the characteristics of the photodiodes 6 and 7 are equal, and therefore the characteristics of the two optical transmission lines are equal.

Figure 3B:
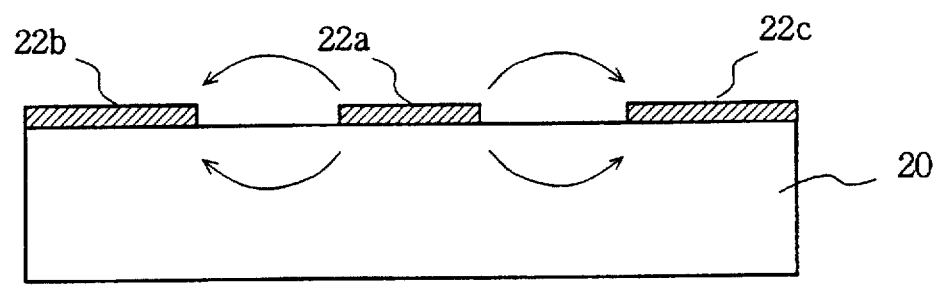
FIG. 3B is a sectional view taken along the section Y—Y in FIG. 2.
Figure 3C:
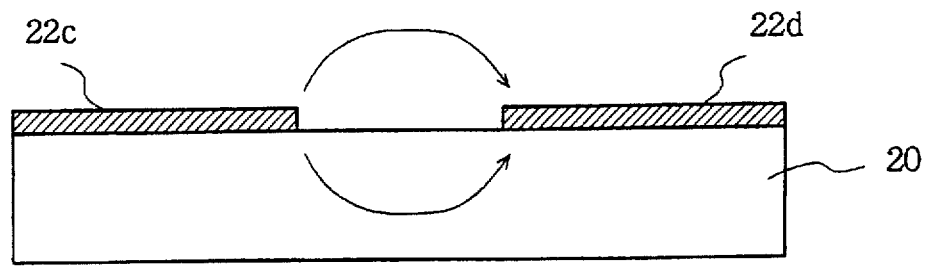
FIG. 3C is a sectional view taken along the section Z—Z in FIG. 2.
Figure 4:
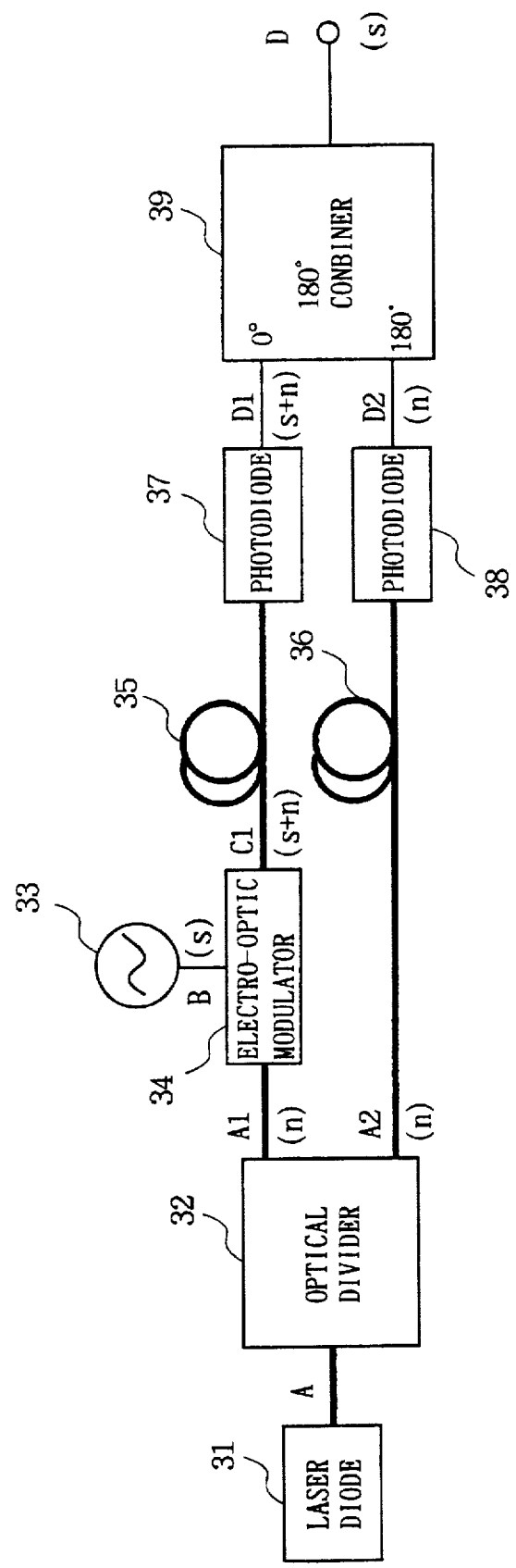
FIG. 4 is a block diagram showing the structure of a conventional fiber optic communication system.

FIG. 2 is a plan of the optical modulation device 1 of FIG. 1. FIG. 3A is an X—X sectional view of FIG. 2, FIG. 3B is an Y—Y sectional view of FIG. 2 and FIG. 3C is a Z—Z sectional view of FIG. 2. The arrows in FIGS. 3B and 3C show electric force lines.

In FIG. 2, optical waveguides 21a–21i composed of titanium (Ti) diffusion regions are formed in the surface of a dielectric substrate 20 composed of lithium niobate ($LiNbO_3$) having the electro-optical effect and conductor layers 22a–22j composed of metal, such as gold, are formed on the dielectric substrate 20. Thus, the optical divider 11, the 180° divider 12 and the electro-optic modulators 13 and 14 are constituted on the dielectric substrate 20. The electro-optic modulators 13 and 14 are arranged symmetrically.

The optical divider 11 includes the optical waveguides 21b and 21c branching from the optical waveguide 21a. The optical carrier A inputted from the optical waveguide 21a is branched by the optical divider 11, and the first optical carrier A1 advances in the optical waveguide 21b and the second optical carrier A2 advances in the optical waveguide 21c. As shown in FIG. 3A, the optical waveguide 21a is formed in the surface of the dielectric substrate 20.

The 180° divider 12 is composed of the conductor layers 22a, 22b, 22c, 22d, and 22f formed on the dielectric substrate 20. As shown in FIG. 3B, the conductor 22a serves as a cemter conductor and the conductor layers 22b and 22c serve as ground conductors, and thus a strip line (a co-planar waveguide) is formed. Thus, the RF sub-carrier signal B inputted to the conductor layer 22a advances along the conductor layer 22a.

As shown in FIG. 3C, the conductor layers 22c and 22d form a parallel line (a slot line). Accordingly, the RF sub-carrier signal B advances along the region between the conductor layers 22c and 22d. Furthermore, the first RF sub-carrier signal B1 advances along the region between the conductor layers 22d and 22f and the second RF sub-carrier signal B2 advances along the region between the conductor layers 22c and 22f.

The electro-optic modulator 13 is formed of the optical waveguides 21d and 21e and the conductor layers 22d and 22f formed in and on the surface of the dielectric substrate 20. The first optical carrier A1 provided from the optical divider 11 is branched into the optical waveguides 21d and 21e, which advance in these optical waveguides 21d and 21e, respectively. The first RF sub-carrier signal B1 provided from the 180° divider 12 advances along the region between the conductor layers 22d and 22f. Thus, the modulated first optical signal C1 is outputted from the optical waveguide 21h.

The electro-optic modulator 14 is formed of the optical waveguides 21f, 21g and the conductor layers 22c, 22f formed in and on the surface of the dielectric substrate 20. The second optical carrier A2 provided from the optical divider 11 is branched into the optical waveguides 21f and 21g, which advance in the optical waveguides 21f and 21g, respectively. The second RF sub-carrier signal B2 provided from the 180° divider 12 advances along the region between the conductor layers 22c and 22f. The modulated second optical signal C2 is thus outputted from the optical waveguide 21i.

The conductor layers 22h and 22j are terminated at the resistors R1 and R2, respectively.

This way, the electro-optic modulators 13 and 14 are integrated on the same dielectric substrate 20 and formed in the mutually symmetrical configuration. Accordingly, the optical insertion losses in the electro-optic modulators 13 and 14 are equal and absolute levels of the signals and the noises included in the first and second optical signals C1 and C2 are also equal. The electro-optic modulators 13 and 14 can stably perform balanced operation without adjustment.

Accordingly, the use of the optical modulation device 1 of this embodiment allows construction of an optical fiber link sub-carrier transmission system in the microwave band or the milliwave band without restricted by the relative intensity noise of the light source.

Although the optical waveguides 21a–21i are formed in the dielectric substrate 20 in the embodiment above, the optical waveguides may be formed on the dielectric substrate 20.

In the embodiment above, the co-planar/slot transfer is used as the signal 180° divider (e.g., 12 in FIG. 1), but the rat-race hybrid may be used.

Furthermore, as in the embodiment above, it is preferred that the same kinds of components in each of the optical paths have approximately equal characteristics and disposed approximately symmetrically.

While the invention has been described in detail, the foregoing description is in all aspects illustrative and not restrictive. It is understood that numerous other modifications and variations can be devised without departing from the scope of the invention.

We claim:

1. An optical modulation device, comprising:
    an optical divider for dividing an inputted light carrier into first and second light carriers including the same noise component n;
    a power divider, receiving a high-frequency subcarrier signal generated from a signal source, for dividing the high-frequency subcarrier signal into a first high-frequency subcarrier signal including a signal component s and a second high-frequency subcarrier signal including a signal component −s inverted in phase by 180° with respect to the first high-frequency subcarrier signal and outputting said first and second high-frequency subcarrier signals;
    a first external modulator for modulating said first light carrier outputted from said optical divider with said first high-frequency subcarrier signal outputted from said power divider to output a first optical signal including the signal component s and the noise component n; and
    a second external modulator for modulating said second light carrier outputted from said optical divider with said second high-frequency subcarrier signal outputted from said power divider to output a second optical signal including the signal component −s and the noise component n.

2. The optical modulation device according to claim 1, wherein said optical divider, said power divider, said first external modulator and said second external modulator are integrated on and/or in a dielectric substrate having the electro-optical effect.

3. The optical modulation device according to claim 1, wherein said first and second external modulators are formed approximately symmetrically to each other on and/or in a dielectric substrate having the electro-optical effect.

4. The optical modulation device according to claim 1, wherein said optical divider includes,
    a first optical waveguide for transmitting said inputted light, and
    second and third optical waveguides branching from said first optical waveguide for transmitting said first and second lights, respectively.

5. The optical modulation device according to claim 1, wherein said power divider includes,
    a first line for transmitting said inputted high-frequency signal, and
    second and third lines branching from said first line for transmitting said first and second high-frequency signals, respectively.

6. The optical modulation device according to claim 2, wherein said first external modulator includes,
    fourth and fifth optical waveguides formed on and/or in said dielectric substrate, branching from a first input portion receiving said first light from said optical divider and meeting at a first output portion, and
    a fourth line formed on said dielectric substrate along said fourth optical waveguide for transmitting said first high-frequency signal from said power divider, and
    said second external modulator includes,
    sixth and seventh optical waveguides formed on and/or in said dielectric substrate, branching from a second input portion receiving said second light from said optical divider and meeting at a second output portion, and
    a fifth line formed on said dielectric substrate along said sixth optical waveguide for transmitting said second high-frequency signal from said power divider.

7. The optical modulation device according to claim 2, wherein said optical divider includes,
    a first optical waveguide formed on and/or in said dielectric substrate for transmitting said inputted light, and
    second and third optical waveguides formed on and/or in said dielectric substrate and branching from said first optical waveguide for transmitting said first and second lights, respectively,
    said power divider includes,
    a first line formed on said dielectric substrate for transmitting said inputted high-frequency signal, and
    second and third lines formed on said dielectric substrate and branching from said first line for transmitting said first and second high-frequency signals, respectively,
    said first external modulator includes,
    fourth and fifth optical waveguides formed on and/or in said dielectric substrate, branching from a first input portion receiving said first light from said optical divider and meeting at a first output portion, and
    a fourth line formed on said dielectric substrate along said fourth optical waveguide for transmitting said first high-frequency signal from said power divider, and
    said second external modulator includes,
    sixth and seventh optical waveguides formed on and/or in said dielectric substrate, branching from a second input portion receiving said second light from said optical divider and meeting at a second output portion, and
    a fifth line formed on said dielectric substrate along said sixth optical waveguide for transmitting said second high-frequency signal from said power divider.

8. The optical modulation device according to claim 7, wherein said first and second external modulators are formed approximately symmetrically to each other on and/or in said dielectric substrate.

9. The optical modulation device according to claim 7, wherein
    said first optical waveguide includes a first diffusion region formed in the surface of said dielectric substrate,
    said second optical waveguide includes a second diffusion region formed in the surface of said dielectric substrate and connecting to said first diffusion region, and
    said third optical waveguide includes a third diffusion region formed in the surface of said dielectric substrate and connecting to said first diffusion region.

10. The optical modulation device according to claim 7, wherein
    said first line includes a first co-planar waveguide formed on the surface of said dielectric substrate and a first slot line formed on the surface of said dielectric substrate and connecting to said first co-planar waveguide,
    said second line includes a second slot line formed on the surface of said dielectric substrate and connecting to said first slot line, and
    said third line includes a third slot line formed on the surface of said dielectric substrate and connecting to said first slot line.

11. The optical modulation device according to claim 7, wherein
    said fourth and fifth optical waveguides include fourth and fifth diffusion regions, respectively, formed in the surface of said dielectric substrate, said sixth and seventh optical waveguides include sixth and seventh diffusion regions, respectively, formed in the surface of said dielectric substrate, said fourth line includes a fourth slot line formed on the surface of said dielectric substrate along said fourth diffusion region and connecting to said second line, and a second co-planar waveguide formed on the surface of said dielectric substrate and connecting to said fourth slot line, said fifth line includes a fifth slot line formed on the surface of said dielectric substrate along said sixth diffusion region and connecting to said third line, and a third co-planar waveguide formed on the surface of said dielectric substrate and connecting to said fifth slot line, and each of said second co-planar waveguide and said third co-planar waveguide is terminated at a resistance.

12. A fiber optic communication system, comprising:

a light source for generating a light;

a signal source for generating a high-frequency signal;

a optical divider for dividing the light generated from said light source into first and second lights;

a power divider for dividing said high-frequency signal generated from said signal source into first and second high-frequency signals with phases substantially inverted to each other;

a first external modulator for modulating said first light outputted from said optical divider with said first high-frequency signal outputted from said power divider to output a first optical signal;

a second external modulator for modulating said second light outputted from said optical divider with said second high-frequency signal outputted from said power divider to output a second optical signal;

a first optical fiber for transmitting the first optical signal outputted from said first external modulator;

a second optical fiber for transmitting the second optical signal outputted from said second external modulator;

a first light detector for converting the first optical signal transmitted by said first optical fiber into an electric signal;

a second light detector for converting the second optical signal transmitted by said second optical fiber into an electric signal; and a combiner for substantially inverting a phase of one of the electric signals outputted from said first and second light detectors and combining the inverted electric signal with the other electric signal.

13. The fiber optic communication system according to claim 12, wherein said optical divider, said power divider, said first external modulator and said second external modulator are integrated on and/or in a dielectric substrate having the electro-optical effect.

14. The fiber optic communication system according to claim 12, wherein said first and second external modulators are formed approximately symmetrically to each other on and/or in a dielectric substrate having the electro-optical effect.

15. The fiber optic communication system according to claim 12, wherein said optical divider includes, a first optical waveguide for transmitting said inputted light, and second and third optical waveguides branching from said first optical waveguide for transmitting said first and second lights, respectively.

16. The fiber optic communication system according to claim 12, wherein said power divider includes, a first line for transmitting said inputted high-frequency signal, and second and third lines branching from said first line for transmitting said first and second high-frequency signals, respectively.

17. The fiber optic communication system according to claim 12, wherein said first external modulator includes, fourth and fifth optical waveguides formed on and/or in a dielectric substrate having the electro-optical effect, and branching from a first input portion receiving said first light from said optical divider and meeting at a first output portion, and a fourth line formed on said dielectric substrate along said fourth optical waveguide for transmitting said first high-frequency signal from said power divider, and said second external modulator includes, sixth and seventh optical waveguides formed on and/or in said dielectric substrate, and branching from a second input portion receiving said second light from said optical divider and meeting at a second output portion, and a fifth line formed on said dielectric substrate along said sixth optical waveguide for transmitting said second high-frequency signal from said power divider.

18. The fiber optic communication system according to claim 12, wherein said light source comprises a laser diode.

19. The fiber optic communication system according to claim 12, wherein said first and second light detectors comprise of a photoelectric conversion element.

20. The fiber optic communication system according to claim 12, wherein the light generated by said light source is a optical carrier, and the high-frequency signal generated by said signal source is a high-frequency sub-carrier signal.

* * * * *